United States Patent
Peuhkurinen

(10) Patent No.: US 11,651,542 B1
(45) Date of Patent: May 16, 2023

(54) SYSTEMS AND METHODS FOR FACILITATING SCALABLE SHARED RENDERING

(71) Applicant: Varjo Technologies Oy, Helsinki (FI)

(72) Inventor: Ari Antti Erik Peuhkurinen, Helsinki (FI)

(73) Assignee: Varjo Technologies Oy, Helsinki (FI)

(*) Notice: Subject to any disclaimer, the term of this patent is extended or adjusted under 35 U.S.C. 154(b) by 0 days.

(21) Appl. No.: 17/543,841

(22) Filed: Dec. 7, 2021

(51) Int. Cl.
- *G06T 15/00* (2011.01)
- *G06T 15/20* (2011.01)
- *G06T 19/00* (2011.01)

(52) U.S. Cl.
CPC .......... *G06T 15/005* (2013.01); *G06T 15/205* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 2020/0306629 A1 | 10/2020 | Yong | |
| 2020/0409451 A1* | 12/2020 | Mukherjea | G06T 19/006 |

FOREIGN PATENT DOCUMENTS

| | | | |
|---|---|---|---|
| CN | 112835445 A | 5/2021 | |
| EP | 3913478 A1 | 11/2021 | |

OTHER PUBLICATIONS

Trieu C. Chieu, Ajay Mohindra, Alexei A. Karve, Alla Segal, "Dynamic Scaling of Web Applications in a Virtualized Cloud Computing Environment," 2009 IEEE International Conference on e-Business Engineering, 2009, pp. 281-286, doi: 10.1109/ICEBE.2009.45. (Year: 2009).*

Rui Han, Moustafa M. Ghanem, Li Guo, Yike Guo, Michelle Osmond, "Enabling Cost-Aware and Adaptive Elasticity of Multi-Tier Cloud Applications," 2014, Future Generation Computer Systems, 32:82-98 (Year: 2014).*

Prasad Jogalekar, Murray Woodside, "Evaluating the Scalability of Distributed Systems," 2000, IEEE Transactions on Parallel and Distributed Systems, 11(6):589-603 (Year: 2000).*

European Patent Office, Notification of Transmittal of The International Search Report and the Written Opinion of the International Searching Authority, or the Declaration, dated Jan. 9, 2023, 17 Pages.

* cited by examiner

*Primary Examiner* — Michael J Cobb
(74) *Attorney, Agent, or Firm* — Ziegler IP Law Group, LLC

(57) ABSTRACT

A system for facilitating scalable shared rendering, including plurality of servers communicably coupled to each other, each server executing executable instance of rendering software, being communicably coupled to display apparatus(/es), wherein when executed, rendering software causes each server to receive information indicative of poses of users of display apparatus(/es), utilise three-dimensional model(/s) of extended-reality environment to generate images from poses, send images to respective display apparatus(/es) for display, wherein at least one of plurality of servers is configured to detect when total number of display apparatuses to be served exceeds predefined threshold number, and employ new server and execute new executable instance of rendering software when predefined threshold number is exceeded, wherein new display apparatuses are served by new server, thereby facilitating scalable shared rendering.

8 Claims, 2 Drawing Sheets

SYSTEMS AND METHODS FOR FACILITATING SCALABLE SHARED RENDERING

TECHNICAL FIELD

The present disclosure relates to systems for facilitating scalable shared rendering. The present disclosure also relates to methods for facilitating scalable shared rendering.

BACKGROUND

With the popularization of the idea of a global nation, communication channels have grown to be inclusive, providing real-time access throughout the globe. Moreover, interactive visual content is not limited to being displayed only on a single device nowadays but can be accessed by multiple users using multiple devices. For example, collaborative virtual movie screenings, collaborative extended-reality games, simulators, and the like, can be accessed by multiple users using multiple extended-reality display apparatuses.

However, development and rendering of interactive visual content for multiple devices is quite complex and is associated with several limitations. Some presently available techniques utilize individually dedicated servers for generating visual content for a given corresponding device. Therefore, when visual content is to be generated for multiple devices, multiple servers have to be used for said generation. Such presently available techniques require a large amount of computing resources and are, therefore, expensive.

Other existing techniques utilize a processing capability of a single device for facilitating shared rendering of visual content with other devices. However, this places a lot of computing burden on the single device. Moreover, such techniques are not scalable, since only a limited number of devices can efficiently be served by a single device, limiting the number of users which can connect to the shared rendering facility provided by the single device.

Therefore, in light of the foregoing discussion, there exists a need to overcome the aforementioned drawbacks associated with scalability of shared rendering of visual content between multiple display apparatuses.

SUMMARY

The present disclosure seeks to provide a system for facilitating scalable shared rendering. The present disclosure also seeks to provide a method for facilitating scalable shared rendering. An aim of the present disclosure is to provide a solution that overcomes at least partially the problems encountered in prior art.

In one aspect, an embodiment of the present disclosure provides a system for facilitating scalable shared rendering, the system comprising a plurality of servers communicably coupled to each other, each server executing an executable instance of a same rendering software, wherein each server is communicably coupled to one or more display apparatuses being served by said server, and wherein the rendering software, when executed, causes each server to:
receive, from the one or more display apparatuses being served by said server, information indicative of poses of users of the one or more display apparatuses;
utilise at least one three-dimensional model of an extended-reality environment to generate images from a perspective of the poses of the users of the one or more display apparatuses; and
send the images to respective ones of the one or more display apparatuses for display thereat,
wherein at least one of the plurality of servers is configured to:
detect when a total number of display apparatuses to be served by the plurality of servers exceeds a predefined threshold number of display apparatuses that can be served by existing executable instances of the rendering software being executed on the plurality of servers; and
employ a new server in the system and execute a new executable instance of the rendering software on the new server, when the total number of display apparatuses to be served exceeds the predefined threshold number, wherein new display apparatuses are served by the new server, thereby facilitating scalable shared rendering.

In another aspect, an embodiment of the present disclosure provides a method for facilitating scalable shared rendering, the method being implemented by a plurality of servers communicably coupled to each other, wherein each server is communicably coupled to one or more display apparatuses being served by said server, the method comprising:
executing an executable instance of a same rendering software on each server;
receiving, from the one or more display apparatuses being served by said server, information indicative of poses of users of the one or more display apparatuses;
utilising at least one three-dimensional model of an extended-reality environment to generate images from a perspective of the poses of the users of the one or more display apparatuses;
sending the images to respective ones of the one or more display apparatuses for display thereat;
detecting when a total number of display apparatuses to be served by the plurality of servers exceeds a predefined threshold number of display apparatuses that can be served by existing executable instances of the rendering software being executed on the plurality of servers; and
employing a new server and executing a new executable instance of the rendering software on the new server, when the total number of display apparatuses to be served exceeds the predefined threshold number, wherein new display apparatuses are served by the new server, thereby facilitating scalable shared rendering.

Embodiments of the present disclosure substantially eliminate or at least partially address the aforementioned problems in the prior art, and enable identification of situations where new server(s) are required to server new display apparatuses and scaling up the number of servers to facilitate shared rendering to the display apparatuses.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
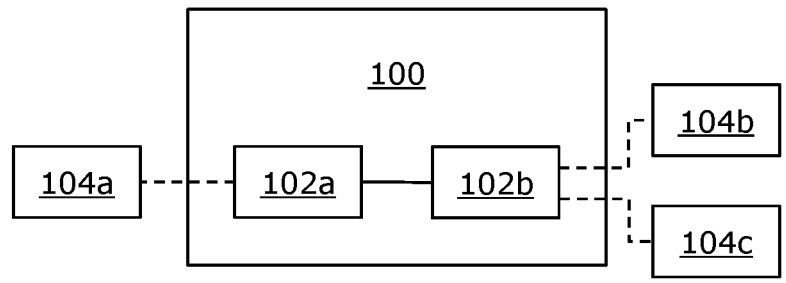
FIG. 1 illustrates a block diagram of architecture of a system for facilitating scalable shared rendering, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a system for facilitating scalable shared rendering, the system comprising a plurality of servers communicably coupled to each other, each server executing an executable instance of a same rendering software, wherein each server is communicably coupled to one or more display apparatuses being served by said server, and wherein the rendering software, when executed, causes each server to:
  receive, from the one or more display apparatuses being served by said server, information indicative of poses of users of the one or more display apparatuses;
  utilise at least one three-dimensional model of an extended-reality environment to generate images from a perspective of the poses of the users of the one or more display apparatuses; and
  send the images to respective ones of the one or more display apparatuses for display thereat,
wherein at least one of the plurality of servers is configured to:
  detect when a total number of display apparatuses to be served by the plurality of servers exceeds a predefined threshold number of display apparatuses that can be served by existing executable instances of the rendering software being executed on the plurality of servers; and
  employ a new server in the system and execute a new executable instance of the rendering software on the new server, when the total number of display apparatuses to be served exceeds the predefined threshold number, wherein new display apparatuses are served by the new server, thereby facilitating scalable shared rendering.

In another aspect, an embodiment of the present disclosure provides a method for facilitating scalable shared rendering, the method being implemented by a plurality of servers communicably coupled to each other, wherein each server is communicably coupled to one or more display apparatuses being served by said server, the method comprising:
  executing an executable instance of a same rendering software on each server;
  receiving, from the one or more display apparatuses being served by said server, information indicative of poses of users of the one or more display apparatuses;
  utilising at least one three-dimensional model of an extended-reality environment to generate images from a perspective of the poses of the users of the one or more display apparatuses;
  sending the images to respective ones of the one or more display apparatuses for display thereat;
  detecting when a total number of display apparatuses to be served by the plurality of servers exceeds a predefined threshold number of display apparatuses that can be served by existing executable instances of the rendering software being executed on the plurality of servers; and
  employing a new server and executing a new executable instance of the rendering software on the new server, when the total number of display apparatuses to be served exceeds the predefined threshold number, wherein new display apparatuses are served by the new server, thereby facilitating scalable shared rendering.

The present disclosure provides the aforementioned system and the aforementioned method for facilitating scalable shared rendering. Herein, each server from the plurality of servers serves one or more display apparatuses, and is capable of serving multiple display apparatuses simultaneously. This considerably reduces costs and computing space requirements associated with visual content development and sharing. Furthermore, the system is scalable since it employs a new server when the total number of display apparatuses to be served by existing servers exceeds the predefined threshold number. The predefined threshold number ensures that a quality of visual content being rendered using the shared rendering is maintained for each of the one or more display apparatuses. In other words, the system can be scaled up to have a larger number of servers when a large number of display apparatuses are to be served, as compared to having a small number of servers employed when a small number of display apparatuses are to be served. Therefore, users can interact with each other in a collaborative manner via their respective display apparatuses. It will be appreciated that the system facilitates scalable shared rendering between a plurality of display apparatuses in real time or near-real time.

Throughout the present disclosure, the term "server" refers to hardware, software, firmware or a combination of these that provides functionality by way of resources, data, services or programs to other servers, and/or one or more display apparatuses. For example, a given server may generate images for one or more display apparatuses. Optionally, the given server is implemented as a cloud server. In such a case, each of the plurality of servers may be implemented as server instances of a cloud server.

The system comprises at least one storage device, coupled to the plurality of servers, for storing the rendering software. The at least one storage device may be implemented as at least one memory. The term "memory" refers to a volatile or persistent medium, such as a magnetic disk, virtual memory or optical disk, in which data or software can be stored for any duration. A given memory may be a local memory that is integrated with a given server, may be an external memory, may be a cloud-based memory, or similar.

The plurality of servers are communicably coupled to each other via a communication network. It will be appreciated that the communication network may be wired, wireless, or a combination thereof. Examples of the communication network include, but are not limited to, Internet, a local network (such as, a TCP/IP-based network, an Ethernet-based local area network, an Ethernet-based personal area network, a Wi-Fi network, and the like), and a short-range radio network (such as Bluetooth®).

Throughout the present disclosure, the term "executable instance" refers to an instance of execution of the rendering software on a given server. Each server executes its own executable instance of the same rendering software. As an example, a first server may execute a first executable instance, a second server may execute a second executable instance, and so forth.

Pursuant to embodiments of the present disclosure, the executable instances may be made aware of each other. In other words, a given server may share, with other servers, information pertaining to the display apparatuses being served by the given server. Such information may comprise information indicative of poses of the users of these display apparatuses.

Furthermore, the term "rendering software" refers to an application or program executing on a processor of a given server that renders images to be presented to users. As an example, the rendering software may be an extended-reality (XR) application that generates XR images, based on poses of the users of the display apparatuses. Such image generation is well-known in the art. It will be appreciated that multiple executable instances of the same rendering software can be executed on a single server simultaneously.

Throughout the present disclosure, the term "display apparatus" refers to specialized equipment that is configured to present an extended-reality (XR) environment to a user. In some implementations, a given display apparatus could be worn by the user on his/her head in operation. In such implementations, the given display apparatus acts as a device (for example, such as an XR headset, a pair of XR glasses, and the like) that is operable to present a visual scene of the XR environment to the user. Throughout the present disclosure, the term "extended-reality" encompasses virtual reality (VR), augmented reality (AR), mixed reality (MR), and the like. In other implementations, a given display apparatus could be any device comprising a display screen or a projector that is to be employed to present the XR environment to the user. Examples of such display apparatuses include, but are not limited to, personal computers, laptops, tablets, smartphones, television sets and game consoles. It will be appreciated that the term "one or more display apparatuses" refers to "one display apparatus" in some implementations, and "a plurality of display apparatuses" in other implementations.

It will be appreciated that since each server is communicably coupled to one or more display apparatuses being served by said server, and there exist a plurality of servers in the system; at a given time, at least two display apparatuses would be served by the system for facilitating scalable shared rendering. For example, if there are two servers, and each server is communicably coupled with one display apparatus each, the system would be facilitating shared rendering for at least two display apparatuses. The given display apparatus is communicably coupled with its corresponding server either directly, or via a communication network, to allow a seamless transfer of data. It will be appreciated that a given communication network may be wired, wireless, or a combination thereof.

Optionally, the given display apparatus comprises a processor that is configured to control an operation of the given display apparatus. The processor may be implemented as a hardware, software, firmware or a combination of these. In an example, the processor may be implemented as a programmable digital signal processor (DSP).

Optionally, the given display apparatus comprises a pose-tracking means for tracking a pose of the user of the given display apparatus, wherein the pose-tracking means is communicably coupled to the processor. Throughout the present disclosure, the term "pose" refers to a position and orientation of a user of a given display apparatus.

Throughout the present disclosure, the term "information indicative of a pose of the user of the given display apparatus" refers to information that indicates the position and the orientation of the user of the given display apparatus within a real-world environment in which the user is present. In particular, said information is indicative of tracked translational movements and rotational movements of the user within the real-world environment.

Optionally, the aforesaid information is determined using pose-tracking data generated by the pose-tracking means of the given display apparatus. Optionally, the pose-tracking data comprises at least one three-dimensional (3D) position and/or at least one three-dimensional (3D) orientation of the given display apparatus or the user's head within a given real-world environment. Optionally, the given real-world environment is represented by a coordinate system having a predefined origin and three coordinate axes, for example, such as X, Y and Z axes. In such a case, a 3D position of the given display apparatus is expressed as (x, y, z) position coordinates along the X, Y and Z axes, respectively. Optionally, a 3D orientation of the given display apparatus is expressed as at least one of: Euler angles, quaternions, rotation matrices, axis angles. It will be appreciated that other conventions for expressing the pose of the user of the given display apparatus in the real-world environment space and representing all six degrees of freedom (6DoF, namely three translational degrees of freedom and three rotational degrees of freedom) can be employed alternatively.

The term "pose-tracking means" refers to a specialized equipment for detecting and/or following the position and the orientation of the given display apparatus (when the given display apparatus in operation is worn by the user) or the user's head. The pose-tracking means may employ an outside-in tracking technique, an inside-out tracking technique, or a combination of both the aforesaid techniques, for collecting pose-tracking data, which constitutes information indicative of the pose of the user of the display apparatus.

The pose-tracking means could be implemented as an internal component of the given display apparatus, as a tracking unit external to the given display apparatus, or as a combination thereof. The pose-tracking means could be implemented as at least one of: an optics-based tracking system (which utilizes, for example, infrared beacons and detectors, infrared cameras, visible-light cameras, detectable objects and detectors, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU), a Global Positioning System (GPS) tracking system. As an example, a detectable object may be an active infra-red (IR) LED, a visible LED, a laser illuminator, a Quick Response (QR) code, an ArUco marker, an anchor marker, a Radio Frequency Identification (RFID) marker, and the like. A detector may be implemented as at least one of: an IR camera, an IR transceiver, a visible light camera, an RFID reader. Such techniques are well-known in the art.

As mentioned earlier, in some implementations, the information pertaining to the display apparatuses is shared between the servers, wherein said information is indicative of poses of the users of the display apparatuses. Optionally, in this regard, the rendering software, when executed, causes a given server to:
  receive, from at least one other server, information indicative of poses of users of one or more display apparatuses being served by the at least one other server; and
  when generating a given image from a perspective of a pose of a user of a given display apparatus being served by the given server,
    generate one or more virtual objects to virtually represent at least one of: the one or more display apparatuses being served by the at least one other server, users of the one or more display apparatuses; and
    overlay the one or more virtual objects on the given image, based on relative poses of the users of the one or more display apparatuses with respect to the user of the given display apparatus.

Hereinabove, the at least one other server refers to at least one server from amongst the plurality of servers. The one or more virtual objects may comprise at least one digital object that virtually represent the at least one of: the one or more display apparatuses being served by the at least one other server, the users of the one or more display apparatuses. For example, in a multiplayer XR game, if a second user is visible in a field of view of a first user, a virtual representation of the second user is generated as a virtual object that is overlaid on an image to be presented to the first user. Optionally, a given virtual object is representative of at least one of: a username of a given user, a device type of a display apparatus of the given user, a pose of the display apparatus, a pose of the given user, a humanoid avatar of the given user, a live stream of the user's face, a live stream of the user's body. Such a live stream may be recorded using a two-dimensional camera, or a three-dimensional camera.

Optionally, in this regard, the relative poses of the users of the one or more display apparatuses with respect to the user of the given display apparatus are determined as offsets of the poses of the users of the one or more display apparatuses from the pose of the user of the given display apparatus. It will be appreciated that the one or more virtual objects are generated depending on a position, a proximity, and/or an orientation of the one or more display apparatuses. This assists in generating realistic images that enable the user of the given display apparatus to see representations of other users.

It will be appreciated that the pose-tracking data is collected repeatedly by the pose-tracking means throughout a given session of using the given display apparatus, as the pose of the user of the display apparatus keeps changing whilst the user moves around in the real-world environment. An up-to-date pose-tracking data allows for producing an up-to-date pose-contingent image, employed to produce an XR image for displaying at the given display apparatus.

Furthermore, throughout the present disclosure, the term "three-dimensional model of the extended-reality environment" refers to a data structure that comprises comprehensive information pertaining to a 3D space of the extended-reality environment. Such comprehensive information is indicative of at least one of: a plurality of features of real or virtual objects present in the extended-reality environment, shapes and sizes of the real or virtual objects or their portions, poses of the real or virtual objects or their portions, optical depths of the real or virtual objects or their portions, materials of the real or virtual objects or their portions, colours of the real or virtual objects or their portions, light sources and lighting conditions within the extended-reality environment, and the like. The term "real object" refers to a physical object, a part of the physical object, as well as a shadow casted by the physical object or its part. The real object could be a living object (for example, such as a human, a pet, and the like) or a non-living object (for example, such as the sky, a building, a road, a toy, a poster, a letter box, and the like). The term "virtual object" refers to a computer-generated object (namely, a digital object). Examples of the at least one virtual object may include, but are not limited to, a virtual navigation tool, a virtual gadget, a virtual message, a virtual entity, a virtual entertainment media, a virtual vehicle or part thereof, and a virtual information.

Optionally, the 3D model of the extended-reality environment is in a form of at least one of: an environment map, a photogrammetric model, a 3D quadrilateral mesh model, a parametric model, a 3D point cloud model, or a 3D data structure that is based on triangles, non-uniform rational basis splines (NURBS) or other surfaces, or voxels. Other suitable forms of the 3D model are also feasible.

It will be appreciated that the given server generates pose-consistent images for the one or more display apparatuses being served by the given server. Using a single server for generating images for multiple display apparatuses is resource-efficient, cost-efficient, computationally efficient and space-efficient.

The given server, in operation, generates images that are to be rendered at the one or more display apparatuses, according to their corresponding poses. Optionally, a given image is an XR image. The XR image may pertain to an XR game, an XR tutorial, an XR instructional simulator, an XR movie, an XR educational video, and the like. As an example, the given server may generate XR images pertaining to a multiplayer XR shooting game for the one or more display apparatuses. A user of a display apparatus would view XR images corresponding to his/her display apparatus only. Users of these display apparatuses may interact with each other in a collaborative manner whilst engaging with an XR environment represented by the XR images.

Optionally, when generating a given image frame for a given device pose, the given server is configured to employ at least one image processing algorithm. Optionally, in this regard, the at least one image processing algorithm is at least one of: a computer-generated imagery algorithm, an image cropping algorithm, an image flipping algorithm, an image rotating algorithm, an image sharpening algorithm, an image smoothing algorithm, an image blurring algorithm, an image resizing algorithm, an image orientation algorithm, an image colour-change algorithm, an image merging algorithm, an image slicing algorithm, an image layering algorithm, an image blending algorithm, an image special-effects algorithm.

Post generation, the images are sent to respective display apparatuses. This means that, a given image generated from the perspective of the pose of the user of the given display apparatus is sent to the given display apparatus for display thereat. For example, if the given server is serving ten display apparatuses, a first image generated based on a perspective of a pose of a user of a first display apparatus is sent to the first display apparatus for display thereat, a second image generated based on a perspective of a pose of a user of a second display apparatus is sent to the second display apparatus for display thereat, and so forth.

Furthermore, optionally, each of the plurality of servers is configured to keep a track of a number of display apparatuses being served by said server, and provide information indicative of the number of display apparatuses to the at least one of the plurality of servers. This enables the at least one of the plurality of servers to keep a track of a total number of display apparatuses being served by the existing executable instances of the rendering software executed on the plurality of servers. When the total number of display apparatuses to be served exceeds the predefined threshold number, at least one new server is employed and new executable instances of the rendering software are executed on the at least one new server.

Throughout the present disclosure, the term "predefined threshold number" refers to a maximum number of display apparatuses which can be served by the existing executable instances of the rendering software being executed on the plurality of servers. The predefined threshold number depends on individual serving capacities of (namely, a maximum number of display apparatuses that can be served by each of) the existing executable instances. It will be appreciated that different existing executable instances may have different serving capacities. In implementations where the serving capacities are the same for the existing executable instances, the predefined threshold number can be determined as a product of the serving capacity and the number of existing executable instances of the rendering software.

Notably, detecting when the total number (of display apparatuses being served by the plurality of servers) exceeds the predefined threshold number is advantageous since timely detection of the same assists in employing the new server in real time, such that there is no delay in providing service to the new display apparatuses. Additionally, the predefined threshold number can be determined in a manner that processing capabilities of the existing executable instances are appropriately assigned, and the rendering software is executed seamlessly in each of the executable instances.

The term "new server" refers to an additional server employed in the system, such that it is an addition to the plurality of servers already employed in the system. Herein, when the total number of display apparatuses to be served by the plurality of servers exceeds the predefined threshold number, new display apparatuses are served by the new server executing the new executable instance. Herein, the new executable instance is optionally provided information pertaining to a current scene being rendered to other display apparatuses served by other executable instances. In other words, the new executable instance is made aware of the existing executable instances, and vice versa.

It will be appreciated that the system is not limited to a certain plurality of servers and the number of servers can be increased depending on the number of display apparatuses requiring to be served. In this manner, the system is not limited in its capability to provide shared rendering, and hence facilitates scalable shared rendering such that the number of servers being utilised may be scaled up or down depending on the requirements. Another benefit of this is that in cases where a large number of servers are not required, additional servers may be disconnected to save computational resources and costs. This system also allows real-time or near real-time shared rendering, since the plurality of servers are not overloaded with processing tasks, hence omitting any lags or gaps during the shared rendering. Advantageously, the system employs the rendering software for multiple users, while maintaining quality during single-user experiences as well.

Optionally, a given display apparatus is configured to:
employ at least one sensor of the given display apparatus to collect sensor data representative of at least one of: a user's hand, a hand-held controller;
process the sensor data to generate at least one virtual object representing the at least one of: the user's hand, the hand-held controller; and
overlay the at least one virtual object on an image received from a corresponding server, prior to display thereat.

Throughout the present disclosure, the term "sensor" refers to a device which senses presence of the at least one of: the user's hand, the hand-held controller. Optionally, the at least one sensor is implemented as at least one of: a motion sensor, a proximity sensor, an image sensor, a heat sensor, a depth sensor. Herein, the sensor collects sensor data pertaining to visibility of the at least one of: the user's hand, the hand-held controller within a field of view of the user. Optionally, a representation refers to a shape, a size and/or a pose of the user's hand/controller. Examples of such sensors include, but are not limited to, cameras mounted on the given display apparatus, detector(s) arranged on the given display apparatus, and light sensors arranged on the given display apparatus. It will be appreciated that when multiple display apparatuses are present in the real-world environment, sensor data (namely, the aforesaid information collected via the sensors) can be collected from the multiple display apparatuses. The sensor data can optionally be updated at regular intervals. Such sensor data can then be shared amongst the multiple display apparatuses.

The term "hand-held controller" refers to an input device being used by the user to interact with the XR environment being presented at the given display apparatus. Notably, the user provides an input by pointing towards a particular region in the XR environment using the given input device. As the 3D environment model is representative of the XR environment, the region in the XR environment towards which the user is pointing is identified based on the user's input. Examples of such hand-held controllers may include, but are not limited to, a pointer, a mouse, a keyboard, a joystick, a touchpad, a gamepad, an interactive board, a remote controller, a simulated reality console, an XR controller, a trackball.

Optionally, the at least one virtual object may be represented as at least one of: an image, an animation, an avatar, a textual representation. Herein, the at least one virtual object refers to at least one digital object representing the at least one of: the user's hand, the hand-held controller. For example, in an XR game wherein the user has donned an avatar, the user's hand may be represented as the hand of the avatar.

The processor of the given display apparatus processes the sensor data to generate the at least one virtual object, based on at least one of: the rendering software, a user profile, a user image, an icon, an illustration. Moreover, the at least one virtual object is overlayed onto the image based on the position of the at least one of the user's hand, the hand-held controller, within the field of view of the user. It will be appreciated that the at least one virtual object is generated depending on a position, a proximity, and/or a pose of the user's hand, a position and/or a proximity of the hand-held controller. This assists in generating images which seem more realistic, since if the user's hand or hand-held controller is placed within the field of view of the user, being able to see a representation of the same allows an experience of the user with the system to be increasingly realistic.

Furthermore, optionally, each server is configured to enable display apparatuses being served by said server to join a session of the rendering software, wherein the rendering software, when executed, causes a given server to:

serve new display apparatuses until a maximum number of display apparatuses that can be served by the given server is reached; and allow the new display apparatuses to join the session while the session is ongoing.

Hereinabove, the plurality of display apparatuses join the same session of the rendering software via their corresponding servers, namely corresponding executable instances of the rendering software executing on the corresponding servers. In other words, during the session, a user of a given display apparatus interacts with other users of other display apparatuses as well as the XR environment being presented by the executable instances of the same rendering software. For example, for an XR game, the session may correspond to a multiplayer level of the game wherein multiple users play the game simultaneously. Optionally, the session is created by a given user based on the 3D environment model, as well as additional parameters, including at least one of: a maximum number of users, a plurality of device types supported by the executable instances, a type of executable instances, a rendering quality, a rendering resolution. Optionally, information pertaining to the session can be stored into the storage device and thereafter accessed by the user.

Optionally, in this regard, each server is configured to enable display apparatuses being served by said server to join the session of the rendering software by providing said information pertaining to the session to other executable instances of the software application executing on the at least one server. When an executable instance of the rendering software is executed, the given server keeps connecting with and serving new display apparatuses to facilitate joining of display apparatuses for the ongoing session, till the maximum number of display apparatuses to be served are reached. Advantageously, this allows the system to facilitate scalable shared rendering by allowing the display apparatuses to join the ongoing session.

When a new display apparatus joins the ongoing session, an initial pose of a user of the new display apparatus is selected in a manner that the initial pose is offset from the poses of the users of existing display apparatuses of the ongoing session. This is particularly beneficial when the new display apparatus is located remotely from the existing display apparatuses. The term "offset" refers to both a two-dimensional (2D) offset, as well as a 3D offset within the XR environment being presented to these display apparatuses.

The present disclosure also relates to the method as described above. Various embodiments and variants disclosed above, with respect to the aforementioned first aspect, apply mutatis mutandis to the method.

Optionally, the method further comprises:

employing, by a given display apparatus, at least one sensor to collect sensor data representative of at least one of: a user's hand, a hand-held controller;

processing the sensor data to generate at least one virtual object representing the at least one of: the user's hand, the hand-held controller; and overlaying the at least one virtual object on an image received from a corresponding server, prior to displaying the image at the given display apparatus.

Optionally, the method further comprises at a given server, from at least one other server, information indicative of poses of users of one or more display apparatuses being served by the at least one other server, wherein the step of generating a given image from a perspective of a pose of a user of a given display apparatus being served by the given server comprises:

generating one or more virtual objects to virtually represent at least one of: the one or more display apparatuses being served by the at least one other server, users of the one or more display apparatuses; and overlaying the one or more virtual objects on the given image, based on relative poses of the users of the one or more display apparatuses with respect to the user of the given display apparatus.

Optionally, the method further comprises:

enabling display apparatuses being served by the plurality of servers to join a session of the rendering software;

serving new display apparatuses by a given server until a maximum number of display apparatuses that can be served by the given server is reached; and allowing the new display apparatuses to join the session while the session is ongoing.

DETAILED DESCRIPTION OF THE DRAWINGS

Referring to FIG. 1, illustrated is a block diagram of an architecture of a system 100 for facilitating scalable shared rendering, in accordance with an embodiment of the present disclosure. The system 100 comprises a plurality of servers, such as the servers 102a, 102b communicably coupled to each other. Herein, each server of the plurality of servers 102a, 102b executes an executable instance of a same rendering software, wherein each server 102a, 102b is communicably coupled to one or more display apparatuses 104a, 104b, 104c being served by said server. As shown in FIG. 1, the plurality of servers 102a, 102b comprises a first server 102a and a second server 102b. The first server 102a is communicably coupled to a first display apparatus 104a. The second server 102b is communicably coupled to two display apparatuses 104b, 104c.

Figure 2:
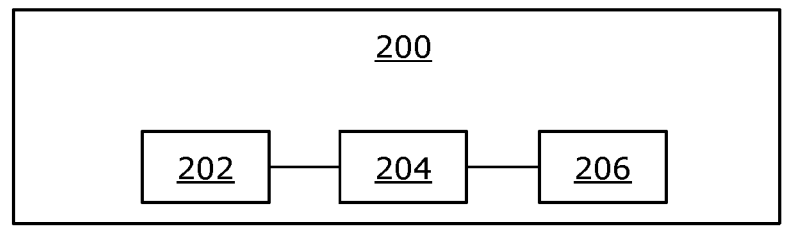
FIG. 2 illustrates a block diagram of architecture of a given display apparatus, in accordance with an embodiment of the present disclosure.

Referring to FIG. 2, illustrated is a block diagram of an architecture of a given display apparatus 200, in accordance with an embodiment of the present disclosure. The given display apparatus 200 comprises a sensor 202, and a processor 204. The given display apparatus 200 further comprises a pose-tracking means 206. The processor 204 is communicably coupled to the sensor 202 and the pose-tracking means 206.

Figure 3:
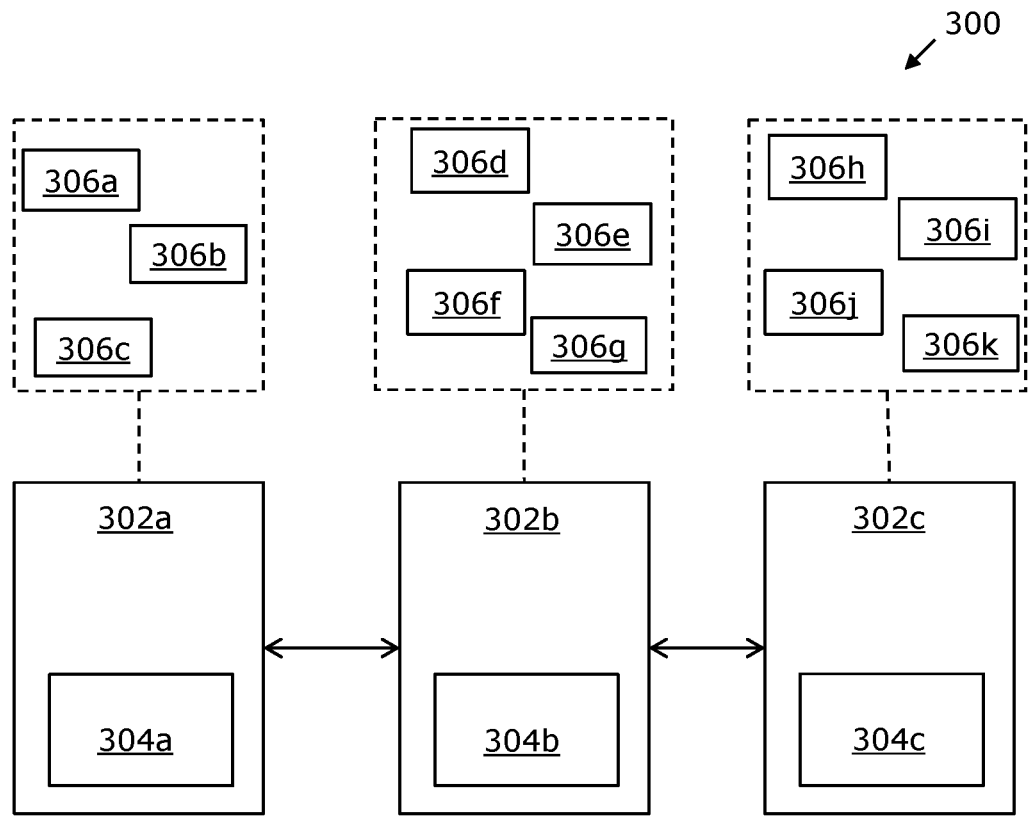
FIG. 3 illustrates a block diagram illustrating architecture of a system for facilitating scalable shared rendering, in accordance with an embodiment of the present disclosure.

Referring to FIG. 3, illustrated is a block diagram illustrating architecture of a system 300 for facilitating scalable shared rendering, in accordance with an embodiment of the present disclosure. The system 300 comprises a plurality of servers 302a, 302b and 302c, depicted as a first server 302a, a second server 302b and a third server 302c, communicably coupled to each other. Herein, each server of the plurality of servers 302a, 302b and 302c executes an executable instance 304a, 304b and 304c, respectively, of a same rendering software. As shown in FIG. 3, the first server 302a executes a first executable instance 304a, the second server 302b executes a second executable instance 304b, and a third server 302c executes a third executable instance 304c.

Each of these servers 302a, 302b and 302c serves a plurality of display apparatuses. As shown in FIG. 3, the first server 302a is communicably coupled to, and serves display apparatuses 306a, 306b and 306c. The second server 302b is communicably coupled to, and serves display apparatuses 306d, 306e, 306f and 306g. The third server 302c is communicably coupled to, and serves display apparatuses 306h, 306i, 306j and 306k.

It may be understood by a person skilled in the art that the FIG. 3 is merely an example for sake of clarity, which should not unduly limit the scope of the claims herein. It is to be understood that the specific implementations of the system 100 and 300 are provided as examples and are not to be construed as limiting them to specific numbers, types, or arrangements of servers and display apparatuses. The person skilled in the art will recognize many variations, alternatives, and modifications of embodiments of the present disclosure.

Figure 4:
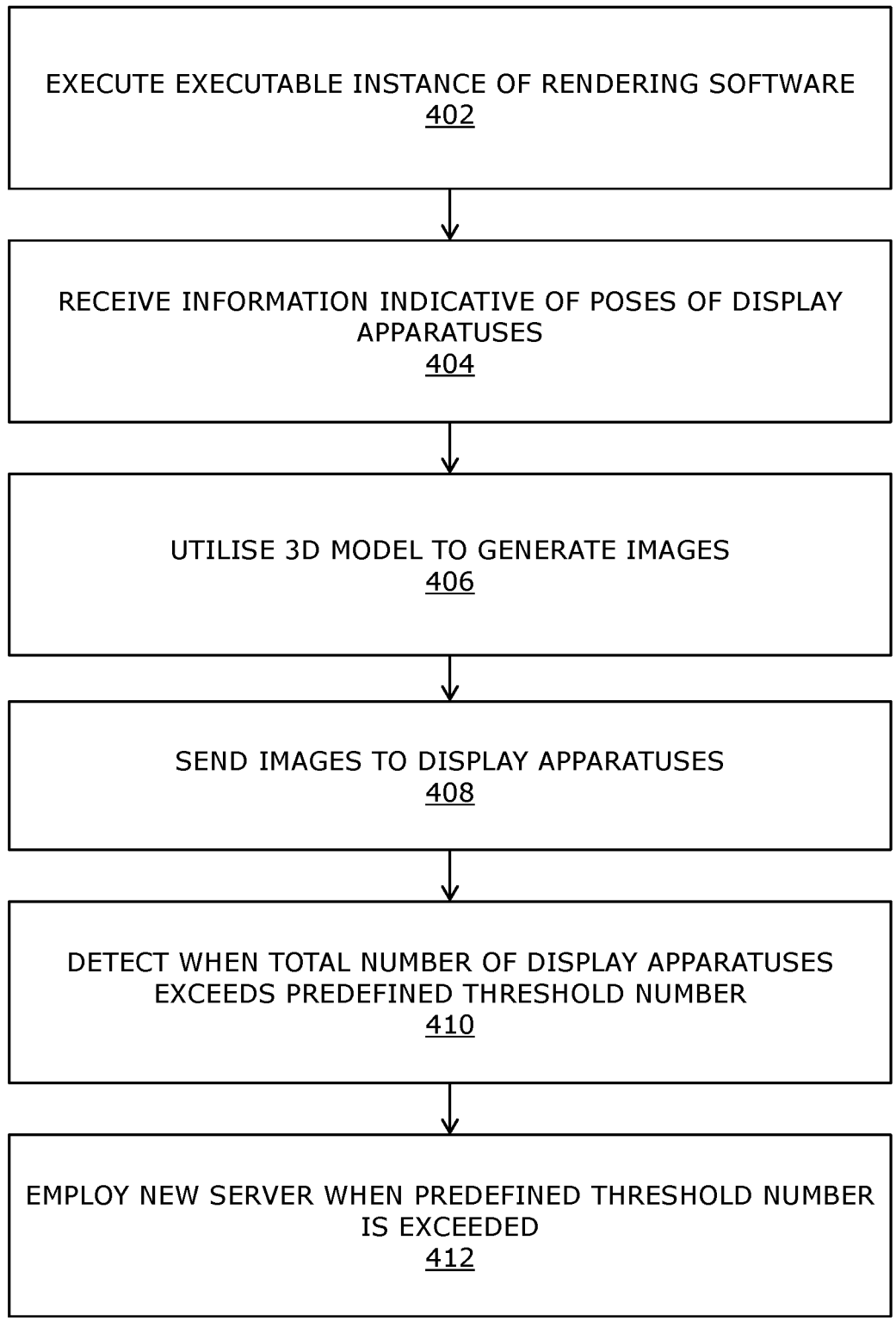
FIG. 4 illustrates steps of a method for facilitating scalable shared rendering, in accordance with an embodiment of the present disclosure.

Referring to FIG. 4, illustrated are steps of a method for facilitating scalable shared rendering, in accordance with an embodiment of the present disclosure. The method is implemented by a plurality of servers communicably coupled to each other, wherein each server is communicably coupled to one or more display apparatuses being served by said server. At step 402, an executable instance of a same rendering software is executed on each server. At step 404, information indicative of poses of the users of the one or more display apparatuses is received from the one or more display apparatuses being served by said server. At step 406, at least one three-dimensional model of an extended-reality environment is utilised to generate images from a perspective of the poses of the users of the one or more display apparatuses. At step 408, the images are sent to respective ones of the one or more display apparatuses for display thereat. At step 410, when a total number of display apparatuses to be served by the plurality of servers exceeds a predefined threshold number of display apparatuses that can be served by existing executable instances of the rendering software being executed on the plurality of servers is detected. At step 412, when the total number of display apparatuses to be served exceeds the predefined threshold number, a new server is employed and a new executable instance of the rendering software is executed on the new server, wherein new display apparatuses are served by the new server, thereby facilitating scalable shared rendering.

The steps 402, 404, 406, 408, 410 and 412 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for facilitating scalable shared rendering, the system comprising a plurality of servers communicably coupled to each other, each server executing an executable instance of a same rendering software, wherein each server is communicably coupled to one or more display apparatuses being served by said server, and wherein the rendering software, when executed, causes each server to:
    receive, from the one or more display apparatuses being served by said server, information indicative of poses of users of the one or more display apparatuses;
    utilise at least one three-dimensional model of an extended-reality environment to generate images from a perspective of the poses of the users of the one or more display apparatuses; and
    send the images to respective ones of the one or more display apparatuses for display thereat,
wherein at least one of the plurality of servers is configured to:
    detect when a total number of display apparatuses to be served by the plurality of servers exceeds a predefined threshold number of display apparatuses that can be served by existing executable instances of the rendering software being executed on the plurality of servers; and
    employ a new server in the system and execute a new executable instance of the rendering software on the new server, when the total number of display apparatuses to be served exceeds the predefined threshold number, wherein new display apparatuses are served by the new server, thereby facilitating scalable shared rendering.

2. The system of claim 1, wherein a given display apparatus is configured to:
    employ at least one sensor of the given display apparatus to collect sensor data representative of at least one of: a user's hand, a hand-held controller;
    process the sensor data to generate at least one virtual object representing the at least one of: the user's hand, the hand-held controller; and
    overlay the at least one virtual object on an image received from a corresponding server, prior to display thereat.

3. The system of claim 1, wherein the rendering software, when executed, causes a given server to:
    receive, from at least one other server, information indicative of poses of users of one or more display apparatuses being served by the at least one other server; and
    when generating a given image from a perspective of a pose of a user of a given display apparatus being served by the given server,
        generate one or more virtual objects to virtually represent at least one of: the one or more display apparatuses being served by the at least one other server, users of the one or more display apparatuses; and
        overlay the one or more virtual objects on the given image, based on relative poses of the users of the one or more display apparatuses with respect to the user of the given display apparatus.

4. The system of claim 1, wherein each server is configured to enable display apparatuses being served by said server to join a session of the rendering software,
    wherein the rendering software, when executed, causes a given server to:
        serve new display apparatuses until a maximum number of display apparatuses that can be served by the given server is reached; and allow the new display apparatuses to join the session while the session is ongoing.

5. A method for facilitating scalable shared rendering, the method being implemented by a plurality of servers communicably coupled to each other, wherein each server is communicably coupled to one or more display apparatuses being served by said server, the method comprising:

executing an executable instance of a same rendering software on each server;

receiving, from the one or more display apparatuses being served by said server, information indicative of poses of users of the one or more display apparatuses;

utilising at least one three-dimensional model of an extended-reality environment to generate images from a perspective of the poses of the users of the one or more display apparatuses;

sending the images to respective ones of the one or more display apparatuses for display thereat;

detecting when a total number of display apparatuses to be served by the plurality of servers exceeds a predefined threshold number of display apparatuses that can be served by existing executable instances of the rendering software being executed on the plurality of servers; and employing a new server and executing a new executable instance of the rendering software on the new server, when the total number of display apparatuses to be served exceeds the predefined threshold number, wherein new display apparatuses are served by the new server, thereby facilitating scalable shared rendering.

6. The method of claim 5, further comprising:

employing, by a given display apparatus, at least one sensor to collect sensor data representative of at least one of: a user's hand, a hand-held controller;

processing the sensor data to generate at least one virtual object representing the at least one of: the user's hand, the hand-held controller; and overlaying the at least one virtual object on an image received from a corresponding server, prior to displaying the image at the given display apparatus.

7. The method of claim 5, further comprising receiving at a given server, from at least one other server, information indicative of poses of users of one or more display apparatuses being served by the at least one other server, wherein the step of generating a given image from a perspective of a pose of a user of a given display apparatus being served by the given server comprises:

generating one or more virtual objects to virtually represent at least one of: the one or more display apparatuses being served by the at least one other server, users of the one or more display apparatuses; and overlaying the one or more virtual objects on the given image, based on relative poses of the users of the one or more display apparatuses with respect to the user of the given display apparatus.

8. The method of claim 5, further comprising:

enabling display apparatuses being served by the plurality of servers to join a session of the rendering software;

serving new display apparatuses by a given server until a maximum number of display apparatuses that can be served by the given server is reached; and allowing the new display apparatuses to join the session while the session is ongoing.

* * * * *